United States Patent Office 3,661,989
Patented May 9, 1972

3,661,989
PROCESS FOR PREPARING CERTAIN SUBSTITUTED BIS-UREAS
Aleksandra Chrobok Nawakowski, 27 Faucett St., Glenbrook, Conn. 06906
No Drawing. Filed May 31, 1967, Ser. No. 642,329
Int. Cl. C07c 127/18
U.S. Cl. 260—553 A
8 Claims

ABSTRACT OF THE DISCLOSURE

A process for preparing a compound having the formula:

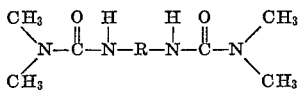

comprising reacting two moles of dimethyl amine with one mole of a diisocyanate having the formula:

$$O=C=N-R-N=C=O$$

wherein R in both structural formulae is a divalent aromatic radical selected from the group consisting of unsubstituted phenylene, methyl substituted phenylene, dimethyl diphenylene and methylene diphenylene wherein said reaction is carried out in an aqueous medium at a temperature between about 10° C. and 30° C. and wherein the initial concentration of dimethyl amine in solution is between about 10% and 30%, by weight, based on the weight of the solution.

CROSS-REFERENCE TO RELATED APPLICATION

This application is related to the United States patent application Ser. No. 520,630, filed Jan. 14, 1966, by Nawakowski et al., now Pat. No. 3,386,955, in which one of the coapplicants therein is the instant applicant.

BACKGROUND OF THE INVENTION

The background of this invention is in the field of certain substituted bis-urea compounds and, more particularly, to the process of preparing the same to produce a class of compounds which are particularly useful as curing agents for epoxy resins. In the copending application referred to hereinabove, the bis-ureas are prepared by reaction of dimethyl amine with certain diisocyanates in an organic medium. More particularly, anhydrous benzene is used principally as the solvent medium and although the yields of product were good, the instant process provides for even better yields.

FIELD OF THE INVENTION

The field of the present invention is in the process arts for producing substituted bis-ureas in an aqueous medium by reacting dimethyl amine with certain diisocyanates.

DESCRIPTION OF THE PRIOR ART

The instant applicant is not aware of any pertinent prior art which is directly related to the concept of the present invention, but U.S. Pat. 3,119,865 is remotely related. Additionally, the above cited application is pertinent.

SUMMARY OF THE INVENTION

This invention relates to a process for preparing a compound having the formula:

comprising reacting two moles of dimethyl amine with one mole of a diisocyanate having the formula:

$$O=C=N-R-N=C=O$$

wherein R in both structural formulae is a divalent aromatic radical selected from the group consisting of unsubstituted phenylene, methyl substituted phenylene, dimethyl diphenylene and methylene diphenylene wherein said reaction is carried out in an aqueous medium at a temperature between about 10° C. and 30° C. and wherein the initial concentration of dimethyl amine in solution is between about 10% and 30%, by weight, based on the weight of the solution. In the above definition of the substituted bis-ureas, the term methyl-substituted phenylene, as employed, is intended to refer to the substitution of the phenyl ring in either an ortho-, meta-, or para-position. It is, of course, to be understood that the isocyanate forms of the divalent aromatic moiety of the molecule may be arranged in more than one isomeric form and, in fact, may be mixtures of two or three isomers. For example, a preferred species of bis-urea is prepared by reacting dimethyl amine with a mixture of 2,4- and 2,6-tolylene diisocyanate to yield a final bis-urea reaction product having a mixed isomeric configuration. The most preferred species of this class of bis-urea curing agents is 1,1'-(4-methyl-m-phenylene)-bis[3,3 - dimethylurea] which permits the preparation of improved polyepoxide-curing agent adhesive compositions that are stable against premature condensation for at least one month after formulation at room temperature and yet will be capable of being cured to a hard thermoset bond at 86–107° C. in about 90 minutes.

Among the diisocyanates which may be used to react with the dimethyl amine to produce the substituted bis-ureas of the present invention are 2,4-tolylene diisocyanate or mixtures thereof with the 2,6-tolylene diisocyanate, the 4,4'-diphenylmethane diisocyanate, orthophenylene diisocyanate, metaphenylene diisocyanate and paraphenylene diisocyanate or isomeric mixtures thereof, 3,3'-dimethyl-4,4'-biphenyl diisocyanate, and the like.

In carrying out the process of the present invention, one will preferably start with an aqueous solution of dimethyl amine in which the concentration of the dimethyl amine in solution may be varied between about 10% and 30%, by weight, based on the total weight of the solution. Preferably, one would use between about 20% and 25%, by weight, of dimethyl amine, same basis. The temperature of the reaction medium should be maintained within the range of about 10° C. and 30° C. and, preferably, between about 15° C. and 20° C. It is preferred that the diisocyanate be added in small increments with constant stirring while maintaining the reaction mixture at a temperature within the ranges set forth hereinabove. Since two moles of the dimethyl amine react with one mole of the selected diisocyanate such a mole ratio should be observed. In order to insure as complete a reaction as possible, it is desirable to use an excess of the dimethyl amine in solution over and beyond the amount stoichiometrically calculated to react fully with the selected diisocyanate. This excess can be from about 1% (i.e., 2.02 moles) to about 20% (i.e., 2.40 moles) in excess of the stoichiometrically calculated amount required to fully react with the selected diisocyanate (i.e., 1 mole of the diisocyanate). Further advantages of the present invention reside in the fact that the product produced has a larger particle size and is, therefore, more readily filtered than the product made in an organic medium, the reaction medium is less costly and safer and the yields are increased.

In order that the concept of the present invention may be more completely understood, the following examples are set forth in which all parts are parts by weight, unless otherwise indicated. These examples are set forth primarily for the purpose of illustration and any specific enumeration of detail contained therein should not be construed

EXAMPLE 1

Into a suitable reaction vessel equipped with thermometer, stirrer and dropping funnel there is introduced 1408 parts (7.82 moles) of 25% aqueous solution of dimethyl amine and 900 parts of water. The solution is maintained at 12° C. by placing the vessel in an ice-water bath. With constant stirring there is added 645 parts (3.71 moles) of 2,4-toluene diisocyanate in small increments to the solution at a constant rate over a period of about two hours while maintaining the temperature of the reaction mixture between about 15 and 20° C. An excess of the amine over the theoretical amount of isocyanate present is required at all times inasmuch as the isocyanate must be added to the amine solution and not the amine added to the isocyanate solution. The reaction mixture is stirred for one hour at about 25° C. after the incremental addition is completed and the product filtered and air dried overnight. The product at this stage is in a hydrated form and has a melting point of 95–100° C., but after complete drying by heating under vacuum at 85–90° C. for two hours, the dried product melted at 182–185° C. The yield is 97%.

EXAMPLE 2

Example 1 is repeated in all essential details except that in the place of the 2,4-toluene diisocyanate there is substituted an equivalent amount of 4,4'-diphenyl methane diisocyanate. A good yield of 1,1'-(methylenediparaphenylene)-bis-[3,3-dimethyl urea] is produced.

EXAMPLE 3

Example 1 is repeated again in all essential details except that in the place of the 2,4-toluene diisocyanate there is substituted an equivalent amount of 3,3'-dimethyl-4,4'-biphenyl diisocyanate. A comparably good yield of 1,1'-(3,3'-dimethyl-4,4'-biphenylene)-bis-[3,3-dimethyl urea] is produced.

EXAMPLE 4

Example 1 is repeated again in all essential details except that in the place of the 2,4-toluene diisocyanate there is substituted an equivalent amount of a mixture of ortho-, meta-, and para-phenylene diisocyanate. A comparably good yield of a mixture of 1,1'-phenylene-bis-[3,3-dimethyl urea] isomers is produced.

EXAMPLE 5

Example 1 is repeated in all essential details except that in the place of 2,4-toluene diisocyanate there is used an equivalent amount of a mixture of 2,4-toluene diisocyanate and 2,6-toluene diisocyanate in a weight ratio of 80/20, respectively. Comparably good yields of the mixture of the isomer of the bis-ureas were produced.

The process of the present invention may readily be converted to a continuous process by starting initially with a previously prepared aqueous dispersion of dimethyl amine in water in the concentration range of between 10 and 30% and, preferably, 20 and 25% wherein at a predetermined point in the reaction after the incremental addition of the diisocyanate has been underway for some period of time with the formation of the bis-urea, incremental addition of further quantities of the dimethyl amine can be begun in stoichiometric, precalculated amounts so as to insure that the concentration of the dimethyl amine in the aqueous medium does not drop below 10%, by weight, based on the total weight of the solution and, preferably, not below 20%, by weight, same basis.

I claim:

1. A process for preparing a compound having the formula:

$$CH_3\!\!\diagdown\!\!\underset{CH_3\diagup}{N}\!-\!\overset{O}{\underset{\|}{C}}\!-\!\overset{H}{\underset{|}{N}}\!-\!R\!-\!\overset{H}{\underset{|}{N}}\!-\!\overset{O}{\underset{\|}{C}}\!-\!\underset{\diagdown CH_3}{\overset{\diagup CH_3}{N}}$$

comprising contacting dimethylamine dissolved in a medium consisting essentially of water to form a solution containing from about 10% to about 30%, by weight of said amine, based on the weight of the overall solution, with a diisocyanate having the formula:

$$O\!=\!C\!=\!N\!-\!R\!-\!N\!=\!C\!=\!O$$

wherein R in both structural formulae is a divalent aromatic radical selected from the group consisting of unsubstituted phenylene, methyl substituted phenylene, dimethyl diphenylene and methylene diphenylene, by adding incrementally said diisocyanate to said solution wherein a reaction is carried out in a medium consisting essentially of water at a temperature between about 10° C. and 30° C., while stirring the mixture, and whereby a total of from 2.02 moles to 2.40 moles of dimethylamine per mole of said diisocyanate is contacted, and recovering the reaction product.

2. The process according to claim 1 in which the temperature is maintained between about 15° C. and 20° C.

3. The process according to claim 2 in which the diisocyanate is 2,4-toluene diisocyanate.

4. The process according to claim 2 in which the diisocyanate is 4,4'-diphenyl methane diisocyanate.

5. The process according to claim 2 in which the diisocyanate is o-phenylene diisocyanate.

6. The process according to claim 2 in which the diisocyanate is 3,3'-dimethyl-4,4'-biphenyl diisocyanate.

7. The process according to claim 1 wherein the initial concentration of dimethyl amine in solution is between about 20% and 25%, by weight, based on the weight of the solution.

8. The process according to claim 1 in which the temperature is maintained between about 15° C. and 20° C. and wherein the initial concentration of dimethyl amine in solution is between about 20% and 25%, by weight, based on the weight of the solution.

References Cited

UNITED STATES PATENTS 3,184,301    5/1965    Martin et al. _____ 260—553

FOREIGN PATENTS 634,690    1/1962    Canada _____ 260—553
884,439    12/1961    Great Britain _____ 260—553 A LEON ZITVER, Primary Examiner M. W. GLYNN, Assistant Examiner